United States Patent
Fleming, Jr. et al.

(10) Patent No.: US 7,421,174 B2
(45) Date of Patent: Sep. 2, 2008

(54) MULTI-WAVELENGTH, MULTIMODE OPTICAL FIBERS

(75) Inventors: James William Fleming, Jr., Westfield, NJ (US); George Edward Oulundsen, III, Belchertown, MA (US)

(73) Assignee: Furakawa Electric North America; Inc., Norcross, GA (US)

( * ) Notice: Subject to any disclaimer, the term of this patent is extended or adjusted under 35 U.S.C. 154(b) by 0 days.

(21) Appl. No.: 11/511,174

(22) Filed: Aug. 28, 2006

(65) Prior Publication Data

US 2008/0050075 A1 Feb. 28, 2008

(51) Int. Cl.
*G02B 6/028* (2006.01)
(52) U.S. Cl. .................................. 385/124; 385/123
(58) Field of Classification Search ............. None
See application file for complete search history.

(56) References Cited

U.S. PATENT DOCUMENTS

| | | | |
|---|---|---|---|
| 3,904,268 A | 9/1975 | Keck et al. | 350/96 |
| 4,025,156 A | 5/1977 | Gloge et al. | 350/96 |
| 4,033,667 A | 7/1977 | Fleming, Jr. | 350/96 |
| 4,042,404 A | 8/1977 | Schultz | 106/52 |
| 4,105,283 A | 8/1978 | Gloge et al. | 350/96.31 |
| 4,111,525 A * | 9/1978 | Kaminow et al. | 385/124 |
| 4,302,074 A * | 11/1981 | Fleming et al. | 385/141 |
| 4,339,173 A | 7/1982 | Aggarwal et al. | 350/96.34 |
| 4,339,174 A | 7/1982 | Levin | 350/96.31 |
| 4,557,561 A | 12/1985 | Schneider et al. | 350/96.34 |
| 4,775,401 A | 10/1988 | Fleming et al. | 65/3.11 |
| 5,240,488 A | 8/1993 | Chandross et al. | 65/3.11 |
| 5,596,668 A | 1/1997 | DiGiovanni et al. | 385/123 |
| 7,336,877 B2 | 2/2008 | Bickham | 385/127 |
| 2005/0013570 A1* | 1/2005 | Guan et al. | 385/124 |
| 2005/0063653 A1* | 3/2005 | Matthijse et al. | 385/123 |

FOREIGN PATENT DOCUMENTS

EP 1503230 2/2005

OTHER PUBLICATIONS

D. Robinson et al., "Key Parameters for Testing Multimode Fiber . . . ," pp. 1-19 (2004), article available on Jul. 27, 2006 on the *Arden Photonics Internet Website*, URL: http://www.ardenphotonics.com.

(Continued)

*Primary Examiner*—Rodney Bovernick
*Assistant Examiner*—Mike Stahl
(74) *Attorney, Agent, or Firm*—Michael J. Urbano (57) ABSTRACT

A silicate optical fiber comprises a graded index silicate core co-doped with aluminum oxide, phosphorus oxide, germanium oxide and fluorine in unique compositions that we have discovered allow multimode, multi-wavelength operation without significant intermodal dispersion. Illustratively, the core comprises a multiplicity of compositions whose refractive indices are graded from a maximum at or near the center of the core to a minimum at the interface with the cladding. Each core composition resides within a sub-volume of a 5 dimensional phase space in which an optimum core profile shape is essentially constant over the wavelength range of operation of the fiber. For operation in the wavelength range of about 0.78 μm to 1.55 μm, each composition preferably comprises no more than approximately 6 mole % $Al_2O_3$, 9 mole % $P_2O_5$, 6 mole % $GeO_2$, 6 mole % F, and 90-100 mole % $SiO_2$.

14 Claims, 3 Drawing Sheets

OTHER PUBLICATIONS

D. Marcuse, "Principles of Optical Fiber Measurements," pp. 4-8, 22-39, *Academic Press, NY* (1981).

J. Wang et al., "The Lowest-loss of 0.35dB/km in an Aluminum-doped SM Optical Fiber," *OFC Abstracts*, OThA1, pp. 1-3 (Mar. 2006).

J. W. Fleming et al., "Refractive index dispersion . . . ," *Appl. Optics*, Vo. 22, No. 19, pp. 3102-3104 (Oct. 1983).

Draka Comteq Product Data Sheets, "HiCap$^{X3}$ Graded Index Multimode Optical Fibre", pp. 1-2 (Nov. 2005).

J. W. Fleming, Jr., "Dispersion Effects in Germanium Silicate . . . ," *Thesis* submitted to The Graduate School—New Brunswick, Rutgers, The State University of New Jersey, pp. 11-12 (Oct. 1981).

Y. Ohmori et al., "Transmission-Loss . . . ," *J. Lightwave Tech.*, vol. LT-1, No. 1, pp. 50-55 (Mar. 1983).

Y. Ohmori et al., "Fabrication of Low-Loss . . . ," *Electr. Lett.*, vol. 18, No. 18, pp. 761-763 (Sep. 1982).

D. Marcuse et al., "Fiber namdwidth-spectrum studies," *Appl. Optics*, vol. 18, No. 19, pp. 3242-3248 (Oct. 1979).

H. M. Presby et al., "Binary silica optical . . . ," *Appl. Optics*, vol. 15, No. 12, pp. 3029-3036 (Dec. 1976).

R. Olshansky, "Multiple-α index profiles," *Appl. Optics.*, vol. 18, No. 5, pp. 683-689 (Mar. 1979).

I. P. Kaminow et al., "Profile synthesis . . . ," *Appl. Optics.*, vol. 16, No. 1, pp. 108-112 (Jan. 1977).

G. Yabre, Comprehensive Theory . . . , *J. Lightwave Tech.*, Nol. 18, No. 2, pp. 166-177 (Feb. 2000).

M. Horiguchi et al., "Profile dispersion . . . ," *Appl. Optics.*, vol. 19, No. 18, pp. 3159-3167 (Sep. 1980).

J. Arnaud et al., "Optimisation of a Graded-Index . . . ," *Electr. Lett.*, vol. 17, No. 10, pp. 339-341 (May 1981).

M. G. Blankenship et al., Optical Fiber Communication, Technical Digest, Post-Deadline Paper PD3, pp. 10-13, Washington, DC (Mar. 1979).

P. J. Lemaire et al., "Alumina Doped Single Mode . . . ," Optical Fiber Conference (OFC), Post-Deadline Paper WI1, pp. 1-4, New Orleans, LA (Jan. 1984).

C. J. Scott, "Optimization of composition for $Al_2O_3/P_2O_5$ . . . ," Optical Fiber Conference (OFC), Paper TUM4, New Orleans, LA (Jan. 1984).

M. J. Andrejco et al., "Rare-Earth Doped Optical Fiber having Core Co-doped with Fluorine" U.S. Appl. No. 11/061,983, filed Feb. 18, 2005.

Cover letter from F. Schoppe to OFS Fitel with attached EPO Communication (search report) dated "Jan. 18, 2008".

\* cited by examiner

CORE CONCENTRATION PROFILE

FIG. 2B

CORE PROFILE SHAPE

MULTI-WAVELENGTH, MULTIMODE OPTICAL FIBERS

BACKGROUND OF THE INVENTION

1. Field of the Invention

This invention relates to optical fibers and, more particularly, to multi-wavelength, multimode silica optical fibers.

2. Discussion of the Related Art

The manufacture of multi-transverse-mode optical fiber (simply multimode fiber hereinafter) has reached a very sophisticated level of development. Yet, in some cases, multimode fiber specifications are so stringent that it is difficult to develop materials and processes capable of satisfying requisite specifications. For example, the properties of many high bandwidth fibers, particularly their dispersion properties, are extremely sensitive to variations in the diameter of the fiber core and its refractive index profile. In fact, calculations for some commercially-available multimode fibers have shown that as little as a 1% variation in core profile induces up to a 10% variation in dispersion. Due to this dispersion effect, specifications for such fiber generally are applicable to only one center wavelength of operation. With that limitation, it is sometimes difficult to achieve adequate bandwidth to meet customer specifications. This bandwidth limitation could be alleviated if the multimode fiber were capable of transmitting an additional center wavelength without introducing significant dispersion; that is, if the multimode fiber were also a multi-wavelength fiber. In this regard, the transmission wavelengths should be sufficiently separate from one another in the frequency domain that they do not significantly overlap, which in turn means that they are separated by more than the linewidth of the center wavelengths.

Early investigators of multimode fiber designs recognized that a parabolic refractive index profile in the core substantially reduced the intermodal dispersion in the fiber. However, they assumed that this parabolic profile would be optimum and that it would be the same for all transmission wavelengths and fiber compositions. This approach did not take into account the variation in refractive index dispersion in different material compositions from which the fibers were constructed. Around 1975, Keck and Olshansky recognized that the variation in dispersive properties of core and cladding materials in multimode fiber did affect the optimum profile shape for any wavelength of operation. They described the now standard representation used to calculate the optimum refractive index profile shape in optical fiber in U.S. Pat. No. 3,904,268 issued on Sep. 9, 1975, which is incorporated herein by reference. In this representation the refractive index $n_c(r)$ of the core at any radius, r, less than the core radius, $\alpha$, is given by $$n_c(r) = n_{c1}[1 - 2\Delta(r/a)^\alpha]^{1/2} \quad (1)$$

where $$\alpha_{opt} = 2 + y - [\Delta(4+y)(3+y)/(5+2y)], \quad (2)$$

$$\Delta = (n_{c1}^2 - n_{c2}^2)/2n_{c1}^2, \quad (3)$$

$$y = -(2n_{c1}/N_1)(\lambda d\Delta/d\lambda)/\Delta, \quad (4)$$

and $$N_1 = n_{c1} - (\lambda d n_{c1}/d\lambda). \quad (5)$$

The quantities $n_{c1}$ and $n_{c2}$ are the refractive indices of the core at r=0 and r=a, respectively, and $\lambda$ is the operating wavelength of the system incorporating the optical fiber as a transmission medium. Prior to recognition of the impact of refractive index dispersion through the y-parameter in equation (4), $\alpha_{opt}$, the optimum profile shape parameter, was expected to be equal to two for all fiber transmission wavelengths.

Following the work of Keck and Olshansky, however, it was recognized that the optimum profile shape varied significantly as a function of transmission wavelength based on the significant variation in dispersion of the component glasses of the multimode optical fiber. Prior art workers suggested several methods to reduce the y-parameter and thereby to obtain a multimode fiber in which the profile shape was more nearly independent of wavelength. In other words, their objective was to design a multimode compositional structure where $d\alpha_{opt}/d\lambda = 0$. For example, in U.S. Pat. No. 4,105,283, which issued on Aug. 8, 1978 and is incorporated herein by reference, D. C. Gloge et al. theoretically outlined a process for modifying the y-parameter by observing the necessary relationships between the dispersions of fiber core and cladding materials. However, they did not actually identify specific materials that had those dispersive characteristics and that could be used to achieve the theoretical profile shapes. In U.S. Pat. No. 4,025,156, which issued on May 24, 1977 and is also incorporated herein by reference, Gloge et al. did describe a specific compositional system, the $GeO_2$—$B_2O_3$—$SiO_2$ glass system, that exhibited the property of $d\alpha_{opt}/d\lambda \sim 0$ for a broad range of wavelengths for multimode fiber. Their example was a multimode fiber that had an NA sufficiently below 0.2 that the fiber would fail to satisfy the current standard for multimode fiber. In addition, J. W. Fleming discovered the same concept in the $P_2O_5$—$B_2O_3$—$SiO_2$ glass system. (See, U.S. Pat. No. 4,033,667, which issued on Jul. 5, 1977 and is incorporated herein by reference.) He found that this glass system has a 500 nm wavelength range for which $d\alpha_{opt}/d\lambda \sim 0$. In this system the fiber NA can easily be made to exceed 0.2.

While the importance of wavelength independence of optimum profile shape was well known in this period of time, the fiber core compositions that provided the appropriate dispersion were very few. Moreover, the few suitable compositions were found to exhibit other problems, such as environmental sensitivity or manufacturing difficulty. As a result, the $B_2O_3$—$SiO_2$ glass system did not become the standard for multimode fiber production; the $GeO_2$—$SiO_2$ system did. Cores that depend on $GeO_2$ for refractive index profiling, however, do not exhibit the optimum profile shape for wavelength independence and can be optimized for only one transmission wavelength. But glasses in the $GeO_2$—$SiO_2$ system are easier to fabricate into optical fiber cores using existing vapor phase methods, such as MCVD, PCVD, and OVD. To date wavelength independence of the optimum profile shape has not been commercially achieved in the 0.78 to 1.55 µm range (nor in the narrower 0.85 to 1.3 µm range) by any manufacturer of multimode fiber.

Thus, a need remains in the art for a multimode fiber that has an essentially optimum core profile shape that is essentially independent of wavelength over a predetermined range of operating wavelengths of the fiber.

BRIEF SUMMARY OF THE INVENTION

Our invention is based on dispersion measurements in a range of multicomponent silicate glass compositions containing greater than 90 mole % silica. Of greatest significance in this work is the observation that $SiO_2$ glasses doped with no more than approximately 6 mole % $Al_2O_3$ have refractive index dispersions that make them very suitable for multimode cores exhibiting low $d\alpha_{opt}/d\lambda$ when used with undoped silica cladding. Through dispersion measurements and calculations we found that small amounts of co-dopants $P_2O_5$, $GeO_2$, and F can be combined with $Al_2O_3$—$SiO_2$ and with each other to create stable glasses and change the refractive index, n, without significantly changing $d\alpha_{opt}/d\lambda$. For example, these co-dopants, when systematically combined in concentrations of only a few mole percent, can achieve a desired index increase for a multimode fiber of 0.2 NA or greater while maintaining a relatively small change in $d\alpha_{opt}/d\lambda$; that is, $\alpha_{opt}$ changes by less than approximately 0.01 over the wavelength range of about 0.78 to 1.55 μm.

In accordance with one aspect of our invention, a silicate multimode optical fiber comprises a multilayered silicate core region co-doped with aluminum oxide, phosphorus oxide, germanium oxide, and/or fluorine in unique compositions that we have discovered allow multimode, multi-wavelength operation without significant intermodal dispersion. Illustratively, the core comprises a multiplicity of compositions whose refractive indices are graded from a maximum at or near the center of the core region to a minimum at the interface with the cladding region. Preferably the index grading follows an approximately parabolic profile.

In accordance with another aspect of our invention, each core and cladding composition resides within a sub-volume of a 5-dimensional phase space in which the desired optimum core profile parameter ($\alpha_{opt}$) is essentially constant over the wavelength range of operation of the fiber. For operation of the multimode fiber, having an NA of approximately 0.2, in the wavelength range of about 0.78 μm to 1.55 μm, each composition preferably comprises no more than approximately 6 mole % $Al_2O_3$, 9 mole % $P_2O_5$, 6 mole % $GeO_2$, 6 mole % F, and 90-100 mole % $SiO_2$.

In one embodiment, the core region includes no more than approximately 2 mole % $P_2O_5$ (without some form of protection from hydrogen defect formation, such as well-known deuterium loading).

In a currently preferred embodiment, the core region includes an inner core region surrounded by an outer core region adjacent to the cladding region, and the outer core region includes essentially no $P_2O_5$ and the inner core region includes essentially no F. In another currently preferred embodiment, the outer core region includes no more than approximately 2 mole % F and 2 mole % $GeO_2$ and the cladding region comprises undoped silica.

BRIEF DESCRIPTION OF THE SEVERAL VIEWS OF THE DRAWING

Our invention, together with its various features and advantages, can be readily understood from the following more detailed description taken in conjunction with the accompanying drawing, in which.

DETAILED DESCRIPTION OF THE INVENTION

General Optical Fiber Fabrication

Optical fiber is produced from a glass preform that includes suitably doped regions from which the core and cladding will be formed. The preform is generally arranged vertically in a draw tower such that a portion of the preform is lowered into a furnace region. The portion of the preform placed into the furnace region begins to soften, and the lower end of the preform forms what is known as the neck-down region, where glass flows from the original cross-sectional area of the preform to the desired cross-sectional area of the fiber. From the lower tip of this neck-down region, the optical fiber is drawn.

The optical fiber typically contains a high-purity silicate glass core optionally doped with a refractive index-raising element such as germanium, an optional inner cladding of high-purity silica glass optionally doped with a refractive index-lowering element such as fluorine, and an outer cladding of undoped silica glass. In some manufacturing processes, the preforms for making such fiber are fabricated by forming an overcladding tube for the outer cladding, and separately forming a core rod containing the core material and inner cladding material. Overcladding tubes are capable of being formed by a sol-gel process, as discussed, for example, in U.S. Pat. No. 5,240,488 issued to E. A. Chandross et al. on Aug. 31, 1993, which is incorporated herein by reference. Alternatively, the overcladding tube may be drawn from a silica billet—such tubes are available commercially. The core rods may be fabricated by any of a variety of vapor deposition methods known to those skilled in the art, including vapor axial deposition (VAD), outside vapor deposition (OVD), plasma chemical vapor deposition (PCVD), and modified chemical vapor deposition (MCVD). MCVD, for example, involves passing a high-purity gas (e.g., a mixture of gases containing silicon and germanium) through the interior of a silica tube (known as the substrate tube) while heating the outside of the tube with a traversing oxy-hydrogen torch. In the heated area of the tube a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated rod in which the substrate tube constitutes the outer portion of the inner cladding material. To obtain a finished preform, the overcladding tube is typically placed over the core rod, and the components are heated and collapsed into a solid, consolidated preform, as discussed in U.S. Pat. No. 4,775,401 issued to D. A. Fleming et al. on Oct. 4, 1988, which is incorporated herein by reference.

Utilizing any of the processes describe above, or any other well known to those skilled on the optical fiber art, we proceed to fabricate an optical fiber preform, and a fiber drawn therefrom, having the characteristics described below.

General Optical Fiber Structure

Figure 1A:
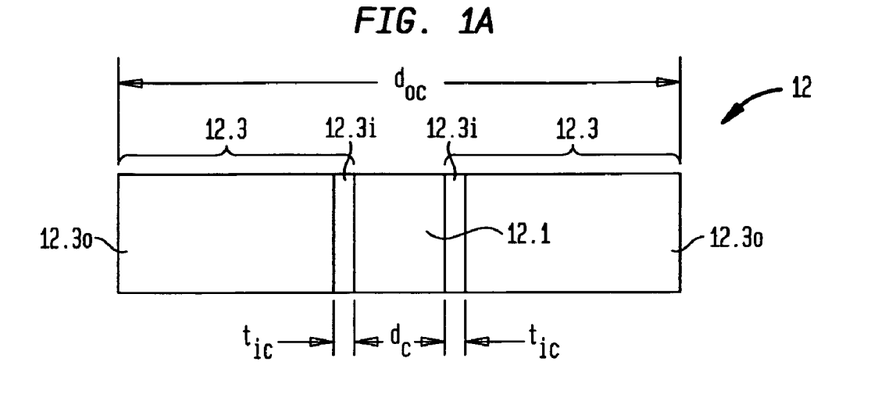
FIG. 1A is a schematic cross-sectional view of an axial segment of an optical fiber taken through its axis of propagation, in accordance with one embodiment of our invention.
Figure 1B:
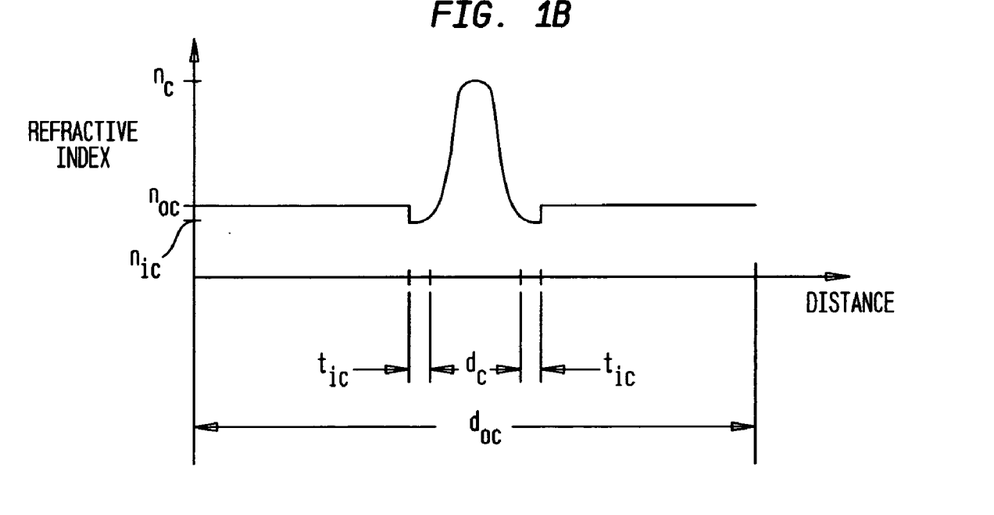
FIG. 1B is a schematic refractive index profile of the fiber shown in FIG. 1A.

In accordance with one aspect of our invention, as shown in FIGS. 1A-1B, a multimode, multi-wavelength silica optical fiber 12 comprises a relatively high index ($n_c$) multilayered silicate core region 12.1 surrounded by an annular, lower index ($n_{clad}$) multilayered cladding region 12.3. In one embodiment, the cladding region 12.3 includes a multilayered outer cladding region 12.3o, and an optional down-doped lower index ($n_{ic}$) multilayered inner cladding region 12.3$i$ disposed between the core region 12.1 and the outer cladding region 12.3$o$. The outer cladding region 12.3$o$ has a refractive index ($n_{oc}$) that is between $n_c$ and $n_{ic}$; that is, $n_{ic} < n_{oc} < n_c$. In addition, the refractive index of the core region 12.1 is graded from a maximum ($n_c$) at or near its center to a minimum ($n_{ic}$) at its interface with the inner cladding region 12.3$i$. Typically the grading profile is approximately parabolic.

Alternatively, the cladding region 12.3 may comprise undoped silica; that is, a down-doped inner cladding region is not essential and, therefore, may be omitted. In this case, $n_{clad} = n_{oc}$. For example, a multimode fiber in accordance with one embodiment of our invention includes a core region 12.1 surrounded by an undoped silica cladding region 12.3 for $\lambda = 0.85$ µm. The profile of the core region 12.3, as shown in FIG. 2B, decreases approximately parabolically ($\alpha = 2.03$) from n~1.4665 at r=0 to n~1.453 at r=a, which corresponds to the refractive index $n_{oc} = n_{clad}$ of undoped silica cladding region 12.3.

In a further alternative embodiment, the outer cladding region 12.3 may comprise doped silica instead of undoped silica.

Figure 1C:
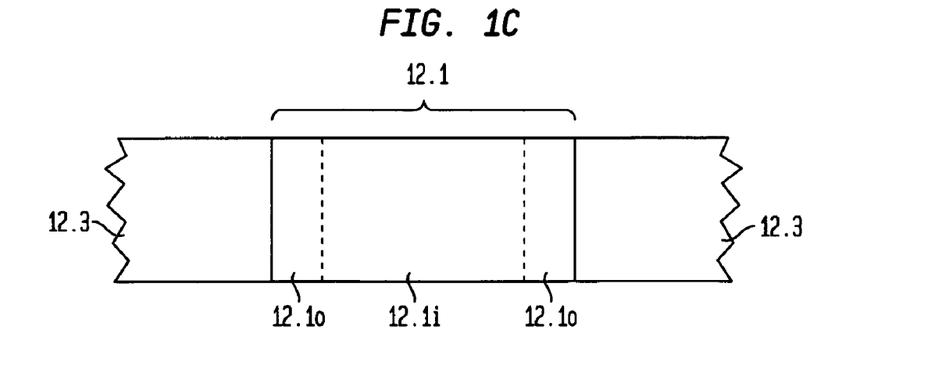
FIG. 1C is a schematic cross-sectional view of an axial segment the core region of an optical fiber in which the core region includes an inner core region and an outer core region, in accordance with another embodiment of our invention.

Preferably, the core region 12.1 comprises a multilayered inner core region 12.1$i$ surrounded by a multilayered, annular outer core region 12.1$o$, as shown in FIG. 1C.

In accordance with one aspect of our invention, the inner and outer core regions 12.1$i$ and 12.1$o$ are silica co-doped with suitable amounts of one or more of the following dopants: P (e.g., a phosphorous oxide such as $P_2O_5$), Ge (e.g., a germanium oxide such as $GeO_2$), Al (e.g., an aluminum oxide such as $Al_2O_3$) and F. In general, $P_2O_5$, $GeO_2$ and $Al_2O_3$ are used to increase the refractive index of silica, whereas F is used to decrease it. Importantly, however, the specific compositions of the co-dopants and their distribution within the core region are chosen to produce an NA of approximately 0.2 and so that the optimum profile shape parameter ($\alpha_{opt}$) is essentially independent of wavelength over the range of about 0.78 to 1.55 µm, preferably at least 0.85 µm to 1.3 µm.

In a currently preferred embodiment of a multimode, multi-wavelength fiber the composition of core region 12.1 comprises approximately no more than the following concentrations of the co-dopants: 6 mole % $Al_2O_3$, 9 mole % $P_2O_5$ (2 mole % in an alternative embodiment), 6 mole % $GeO_2$, and 6 mole % F, such that the concentration of $SiO_2$ within the core region ranges from about 90-100 mole %. In addition, for a fiber in which the outer cladding region 12.3 is undoped silica, the spatial distribution of the co-dopants is preferably configured so that the inner core region 12.1$i$ includes essentially no F, whereas the outer core region 12.1$o$ includes essentially no $P_2O_5$. Moreover, the outer core region 12.1$o$ preferably includes no more than about 6 mole % F, and suitably small amounts of $GeO_2$ (depending on the amount of $GeO_2$ in the inner core region, as discussed infra), when the outer cladding region 12.3 is undoped silica.

In another aspect of a preferred spatial distribution, the concentrations of the co-dopants are graded within the inner and outer core regions 12.1$i$ and 12.1$o$, respectively. Appropriate grading generates the desired refractive index profile within the core region and, furthermore, enables the dispersion of the outer core region 12.1$o$ to be matched to that of the cladding region 12.3.

In general, it is important for minimization of intermodal dispersion that the refractive index dispersion of the outer core region 12.1$o$ matches that of the material surrounding it; that is, the material of the portion of the cladding region immediately adjacent the outer core region 12.1$o$. For example, when PCVD or MVCD is used to manufacture the fiber, the cladding region 12.3 is typically undoped fused silica, and, therefore, the outer core region 12.1$o$ should match the dispersion of such undoped silica.

A concentration of zero mole % is allowed in certain core region layers, a recognition of the fact that the manner in which the refractive index profile is graded allows for any one or more of the four dopants to be omitted in one or more layers of the core region. (The core region illustratively includes 100s to 1000s of layers depending on the fabrication technique used.) On the other hand, the upper limits are primarily related to our discovery that concentrations exceeding those limits tend to make the profile shape parameter wavelength dependent. In some cases, the upper limits may also be related to other fiber characteristics that are adversely affected by, for example, environmental conditions.

We have found that when combined in a fiber with an $Al_2O_3$—$SiO_2$ core region, F can be very useful in increasing the NA while maintaining the desired wavelength independent behavior of $\alpha_{opt}$.

Another revelation of our dispersion work is that there are restrictions on the amount of $GeO_2$ that can be used in the core region when the cladding region composition has a refractive index dispersion similar to that of undoped silica. As was found earlier for the $GeO_2$—$B_2O_3$—$SiO_2$ glass system, $GeO_2$ can be used as an index increasing dopant for multimode waveguides exhibiting low $d\alpha_{opt}/d\lambda$. However, not more than about 6 mole % can be used in the core region before the refractive index dispersion begins to change too much relative to that of $SiO_2$, and $d\alpha_{opt}/d\lambda$ becomes too large for multi-wavelength operation. For example, typical variations in $d\alpha_{opt}/d\lambda$ in prior art multimode fibers can be as (unacceptably) high as 0.1 between wavelengths of 0.85 µm and 1.3 µm. Contrary to the existing knowledge about $GeO_2$ doping in multimode fibers, it is our observation that $GeO_2$ used in suitably small quantities in the outer core region 12.1$o$ can actually lower $d\alpha_{opt}/d\lambda$. For example, consider two illustrative cases of a multimode fiber having an undoped silica cladding. When the inner core region has a maximum of about 5 mole % $GeO_2$, the outer core illustratively has a maximum of about 2 mole % $GeO_2$. On the other hand, when the inner core region has a maximum of about 6 mole % $GeO_2$, the outer core illustratively has less than about 4 mole % $GeO_2$.

$P_2O_5$ is a good index increasing dopant for low $d\alpha_{opt}/d\lambda$, but it has detrimental hydrogen sensitivity and cannot be used above about 2 mole % without some protection from hydrogen defect formation, such as deuterium loading (e.g., hydrogen getter sites in the substrate tube used to fabricate the fiber). This method of hydrogen loss passivation is well known for other fiber designs and would be beneficial in the multimode fibers of our invention. [See, for example, D. J. Giovanni et al., U.S. Pat. No. 5,596,668, which is incorporated herein by reference.] With such a modification $P_2O_5$ is useful up to 9 mole % in at least some embodiments of our invention.

Illustrative Multimode Fiber Design

Figure 2A:
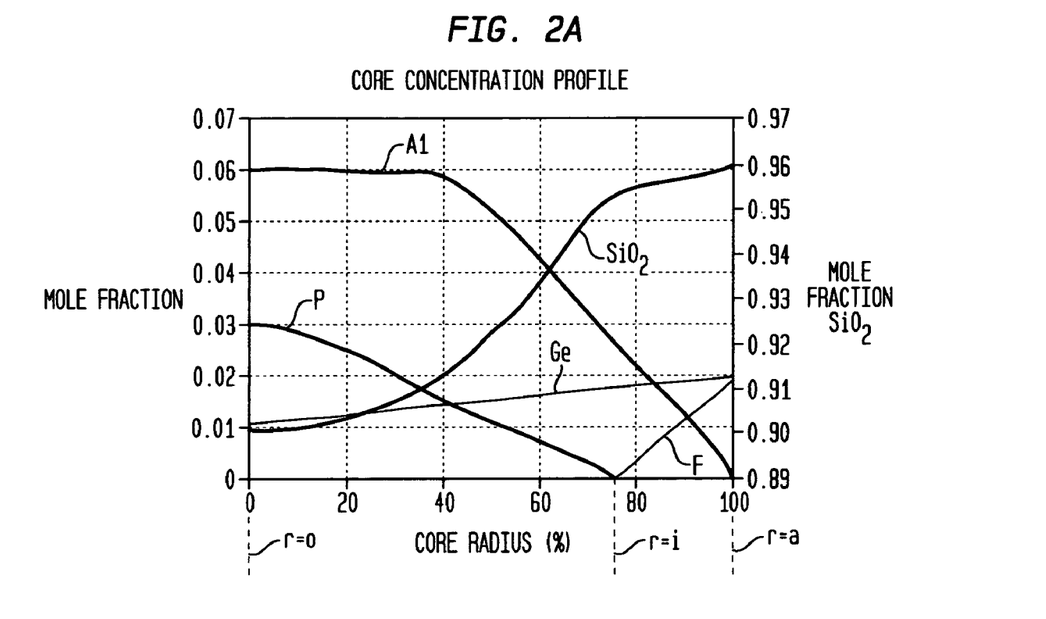
FIG. 2A is a graph showing the concentration profiles of each of the four co-dopants within the core region of a silica multimode fiber having an essentially undoped silica cladding region, in accordance with an illustrative embodiment of our invention as represented by Curve V of FIG. 3 and Table II, infra.
Figure 2B:
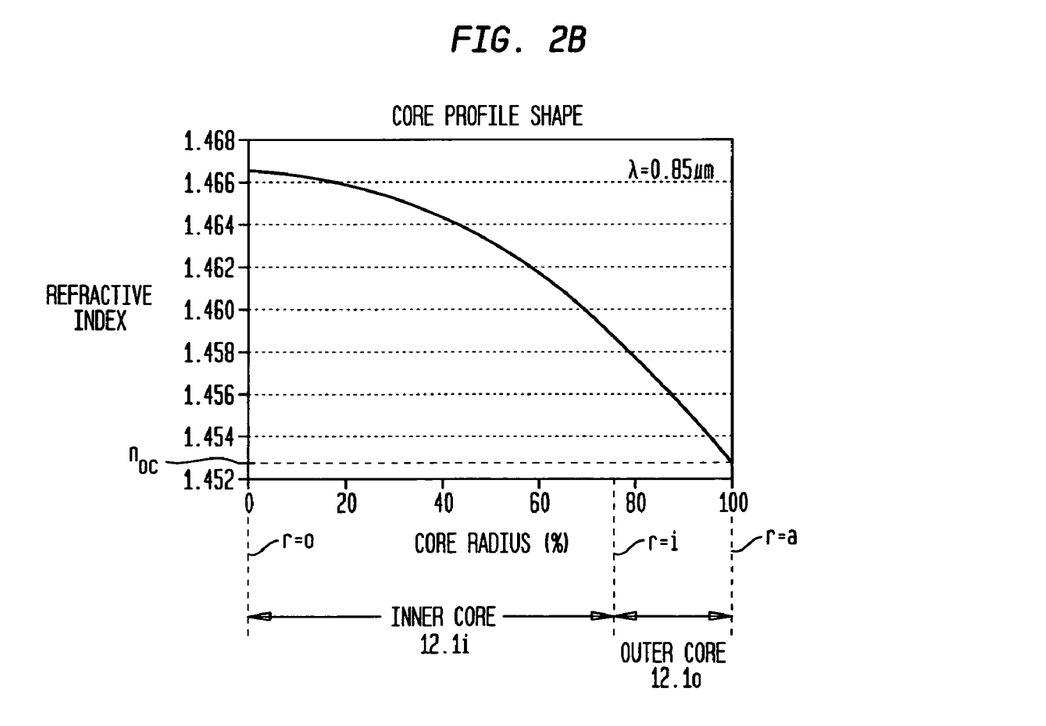
FIG. 2B is a graph showing the essentially parabolic refractive index profile of the core region of the fiber of FIG. 2A at a wavelength of 0.85 μm. Although not shown, the corresponding profiles at other wavelengths within the transmission band would have the same shape but would be displaced along the vertical (index) axis.

Illustrative dopant concentration profiles within the core region of a multimode fiber in accordance with one embodiment of our invention are shown in FIG. 2A. The inner core region 12.1$i$ extends from r=0 to r=i (e.g., i=0.75 a, where $d_c = 2$ a), whereas the outer core region extends from r=i to r=a. The cladding region 12.3 is illustratively undoped silica having a refractive index $n_{clad} = n_{oc} \sim 1.453$ at a wavelength of 0.85 µm.

In general, the interface between the inner and outer core regions at r=i is determined by the desire to confine a specific number of mode groups to the inner core region. For example, to confine the first seventeen mode groups to the inner core region, the interface with the outer core region should be located at approximately r=i=0.75 a. A mode group is a collection of guided modes that have essentially the same propagation constant.

The corresponding, approximately parabolic ($\alpha$=2.03), variation of the refractive index of the core region is shown in FIG. 2B. In this case, the concentration of the Al-oxide, P-oxide and Ge-oxide dopants vary from layer to layer as follows: (1) the $Al_2O_3$ concentration is essentially constant at approximately 6 mole % from r=0 to r=0.4 a and then decreases essentially linearly to 0 mole % at r~a; (2) the $P_2O_5$ concentration decreases essentially linearly from a maximum of approximately 3 mole % at r=0 to 0 mole % at r=i~0.75 a; (3) the $GeO_2$ concentration increases essentially linearly from approximately 1 mole % at r=0 to a maximum of approximately 2 mole % at r=a, and (4) the F concentration increases essentially linearly from 0 mole % at r=i~0.75 a to a maximum of approximately 2 mole % (e.g., 1.9 mole %) at r=a. Significantly, the inner core region 12.1i contains no F, whereas the outer core region 12.1o contains no $P_2O_5$, and the outer core region 12.1o has higher $GeO_2$ concentration than the inner core region 12.1i.

Again it is also important to note that the dispersion of the particular composition chosen for the outer core region 12.1o, especially the layers at or near r=a, matches the dispersion in the transmission wavelength region of fused undoped silica, which is used as the cladding region 12.3 in this type of multimode fiber. The manner in which the various compositions of the graded core region are determined is described in the following section.

$$n^2 - 1 = \sum_{1}^{3} \frac{A_i \lambda^2}{\lambda^2 - L_i^2}, \quad (6)$$

where the oscillator strength $A_i$ is given by $$A_i = M_P A_{iP} + M_{Al} A_{iAl} + M_G A_{iG} + M_F A_{iF} + M_S A_{iS}, \quad (7)$$

and the oscillator wavelength $L_i$ is given by $$L_i = M_P L_{iP} + M_A L_{iAl} + M_G L_{iG} + M_F L_{iF} + M_S L_{iS}. \quad (8)$$

$M_x$ is the mole fraction of each constituent x=A, P, G, F, and S, which are short hand notations for $Al_2O_3$, $P_2O_5$, $GeO_2$, F and $SiO_2$, respectively.

The Sellmeier relationship using these parameters is accurate over the wavelength range (about 0.78-1.55 μm) and compositional ranges of our invention. Again, this range is defined by no more than approximately 6 mole % $Al_2O_3$, 9 mole% $P_2O_5$, 6 mole % $GeO_2$, and 6 mole % F as well as 90 to 100 mole % $SiO_2$.

Using equation (6) and interpolating experimental data obtained from measurements of n($\lambda$) for each of the constituents, we determined the values for $A_i$ and $L_i$ found in Table I below.

TABLE I

| Constituent | $A_1$ | $L_1$ | $A_2$ | $L_2$ | $A_3$ | $L_3$ |
|---|---|---|---|---|---|---|
| $P_2O_5$ | $6.6851 \times 10^{-1}$ | $2.1987 \times 10^{-2}$ | $9.1926 \times 10^{-1}$ | $1.2770 \times 10^{-1}$ | $8.9037 \times 10^{-1}$ | $6.6496 \times 10^{-0}$ |
| $GeO_2$ | $8.0687 \times 10^{-1}$ | $6.8943 \times 10^{-2}$ | $7.1816 \times 10^{-1}$ | $1.5397 \times 10^{-1}$ | $8.5417 \times 10^{-1}$ | $1.1842 \times 10^{-1}$ |
| F | $2.4380 \times 10^{-1}$ | $2.7853 \times 10^{-2}$ | $4.1862 \times 10^{-1}$ | $1.0796 \times 10^{-1}$ | $6.7147 \times 10^{-1}$ | $9.7085 \times 10^{-0}$ |
| $Al_2O_3$ | $5.2620 \times 10^{-1}$ | $3.3076 \times 10^{-2}$ | $9.2344 \times 10^{-1}$ | $1.3345 \times 10^{-1}$ | $2.7205 \times 10^{-0}$ | $1.8988 \times 10^{-1}$ |
| $SiO_2$ | $6.9839 \times 10^{-1}$ | $7.0690 \times 10^{-2}$ | $4.0641 \times 10^{-1}$ | $1.1493 \times 10^{-1}$ | $8.6265 \times 10^{-1}$ | $9.7862 \times 10^{-0}$ |

For multimode operation, the diameter ($d_c$) of the core 12.1 typically ranges from about 30 to 100 μm. When the diameter of the core region is between about 30 and 65 μm, the diameter ($d_{oc}$) of the outer cladding region is about 125 μm, but when the core region is larger, between about 65 and 100 μm, then $d_{oc}$ is about 140 μm. On the other hand, the thickness ($t_{ic}$) of the inner cladding region 12.3i (if one is used) should be large relative to the longest wavelength of operation of the fiber (e.g., a few μm thick for operation up to about 1.6 μm)

In addition, for multimode operation according to current standards the numerical aperture (NA) of the core region 12.1 is typically 0.200±0.015. The NA is a well known fiber parameter that is controlled by the refractive index difference between the inner core region (at r=0) and the cladding region, which in turn is determined by the dopants in both. Thus, about 9 mole % $P_2O_5$ in the core region will produce the desired NA~0.2 when combined with a cladding of undoped $SiO_2$. Multiple dopants in silica, such as 6 mole % $Al_2O_3$ and 4 mole % $P_2O_5$ with the same undoped $SiO_2$ cladding, will also result in a similar NA.

Determining Compositions of Graded Core and Cladding

We now describe how to select appropriate compositions for grading the refractive index of the core in such a way that modal dispersion over a wavelength range of about 0.78-1.55 μm is at an acceptably low level. Refractive indices, n, for the compositions and thus the profile shapes can be calculated using equation (6), which is known as the Sellmeier dispersion relationship:

Let us assume that the preform core region is formed by depositing N (e.g., N=100) sequential layers on a substrate tube, each layer having a different composition $C_j$ corresponding to a different refractive index $n_j$, where j=1, 2, 3 . . . N. First, one must determine the NA required for the multimode fiber and the desired cladding. Then, using the following equation (9):

$$NA = (n^2_{core} - n^2_{clad})^{0.5}, \quad (9)$$

where $n_{core}$ is measured at r=0 and $n_{clad}$ is measured at r>a, one can determine $n_{core}$. For most multimode fiber applications requiring high bandwidth (e.g., 10-Gigabit Ethernet for use in a Local Area Network) the fiber of choice will have a $d_c$=50 μm diameter core region 12.1 with an NA of 0.2±0.015 and a $d_{oc}$=125 μm diameter outer cladding region 12.3o (no inner cladding 12.3i is used in this example). The cladding is typically but not necessarily silica. Then, using equation (6) one can decide upon a suitable core region composition at r=0 and determine the refractive index for any specific wavelength in the transmission range for that composition.

More specifically, using equation (6) we choose our core composition at r=0 and calculate what the $n_c$ value will be (typically an iterative process) for each deposited layer. Finally, we determine the core composition at r=a that gives the necessary value of $n_{oc}$ that we calculated from the value of $n_c$ and the NA. We use equation (6) again in an iterative process to determine the necessary core composition at r=a that gives the correct $n_{oc}$ value; i.e., the value of $n_{oc}$ that ensures that the refractive index dispersion at r=a is close to the refractive index dispersion of the cladding. There can be a slight step or depression in the index at r=a relative to the cladding, but it should be a very small (around ±0.001) index change relative to the cladding index (1.453 at 0.85 µm). These two compositions provide the endpoints of a compositional path used to determine the compositions of each of the intervening layers of the core.

Dispersion Calculations

We fabricated glasses in the $Al_2O_3$—$P_2O_5$—$GeO_2$—F—$SiO_2$ system. Using refractive index dispersion data for bulk glass specimens, we calculated the optimum profile shape $\alpha_{opt}$ for various multimode fiber structures. Results indicate that, because of the relative similarity in dispersion of $SiO_2$ and $Al_2O_3$—$P_2O_5$-doped $SiO_2$ glasses, the wavelength dependence of the optimum profile shape $\alpha_{opt}$ is much smaller than the change observed in the prior art $GeO_2$—$SiO_2$ system. In fact, for the 6 mole % $Al_2O_3$-4 mole % $P_2O_5$-92 mole % $SiO_2$-glass core region 12.1 with an undoped $SiO_2$ cladding region 12.3 and a concentration grading of the two dopants yielding $\alpha$=2.015, our calculations indicate the optimum shapes for 0.85 µm and 1.3 µm are almost identical, deviating by less than 0.5% $\alpha_{opt}$ over the entire wavelength range.

The index increasing property of $GeO_2$ makes it a desirable dopant to continue to use in multimode optical fiber fabrication, but additionally its use in the outer core region 12.1o while being diminished in the inner core region 12.1i helps to moderate the outer core region dispersion so that the optimum profile extension is enhanced. We found that up to 6 mole % $GeO_2$ can be added in conjunction with $Al_2O_3$ in the core region while still maintaining improved wavelength independence of $\alpha_{opt}$. Through the above type of analysis we found that there is a compositional space in the $Al_2O_3$—$P_2O_5$—$GeO_2$—$SiO_2$—F glass system from which glasses can be obtained to satisfy the profile shape $\alpha_{opt}$ at both 0.78 µm and 1.55 µm as well as at all wavelengths in between.

Figure 3:
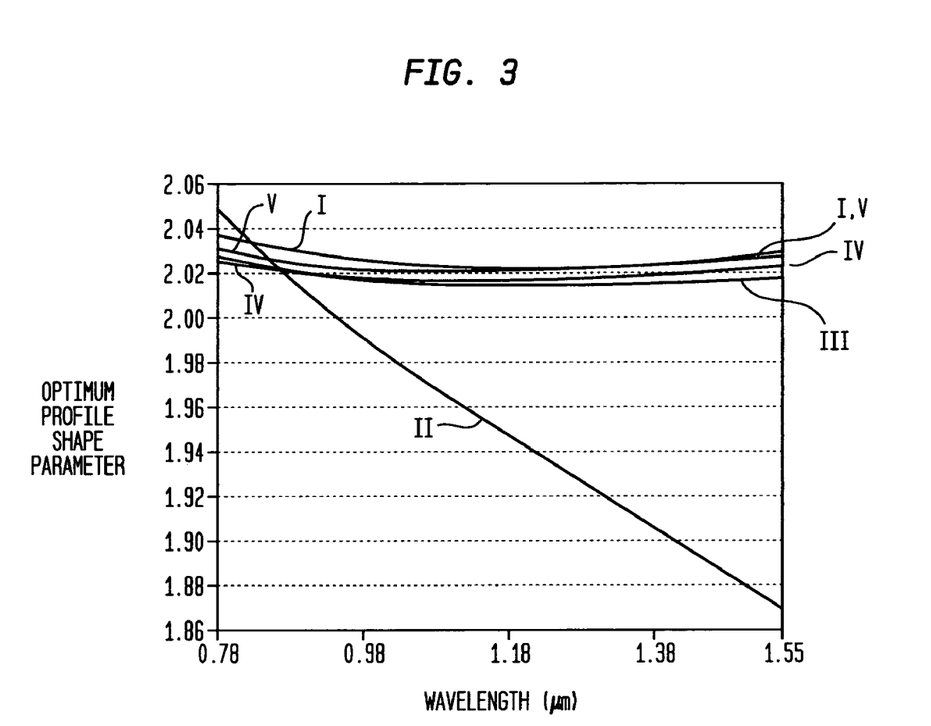
FIG. 3 is a graph showing how the calculated optimum profile shape parameter changes as a function of wavelength for various core region compositions, in accordance with illustrative embodiments of our invention. In particular, the various core region compositions are given in Table II infra; the cladding region is essentially undoped silica.

FIG. 3 exhibits the calculated optimum profile shape parameter $\alpha_{opt}$ behavior for five core-cladding region compositions listed in Table II below. In addition, the specific distribution of each of the components of the currently preferred fiber corresponding to Curve V is shown in FIG. 2A.

TABLE II

| Curve | Inner Core (maximum mole %) | | | Outer Core (maximum mole %) | |
|---|---|---|---|---|---|
| | $Al_2O_3$ | $P_2O_5$ | $GeO_2$ | $GeO_2$ | F |
| I | 4 | 2 | 0 | 1 | 4 |
| II | 0 | 0 | 10 | 0 | 0 |
| III | 4 | 2 | 1 | 1 | 4 |
| IV | 6 | 4 | 0 | 0 | 0 |
| V | 6 | 3 | 1 | 2 | 2 |

The calculated behavior indicates glass systematically chosen from the above allowable compositions (except for Curve II, which represents the composition of a standard multimode fiber design) for the core region of a multimode fiber provides a broad wavelength range for which the profile shape parameter a is close to optimum. For example, $\alpha_{opt}$ for Curve I varies very little from about 2.03 at 0.85 µm to about 2.02 at 1.3 µm, which represents a change of only about 0.5%. Likewise, $\alpha_{opt}$ for Curves III, IV and V also exhibit extremely small changes over the same wavelength range. All four exhibit acceptable independence of $\alpha_{opt}$ in this wavelength range, but Curve V exhibits the smallest change in $\alpha_{opt}$ in this wavelength range. In contrast, $\alpha_{opt}$ for Curve II, which represents a typical conventional multimode fiber, shows considerably larger variation, decreasing dramatically from about 2.03 to 1.92 (5.4%)—more than ten times the variation exhibited by our fibers over the same wavelength range.

Various materials, dimensions and operating conditions are provided by way of illustration only and, unless otherwise expressly stated, are not intended to limit the scope of the invention.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, our invention is applicable to a silica glass body having a core region and a surrounding cladding region in two cases: where the glass body is an optical fiber preform or the fiber itself drawn from such a preform.

We claim:

1. A multimode optical fiber comprising:
    a multilayered silicate glass core region having a refractive index profile shape parameter for broadband operation at wavelengths in the approximate range of 0.78 to 1.55 µm, and
    a cladding region adjacent said core region,
    said core and cladding regions being configured to have an NA of about 0.2 and to support the simultaneous propagation of optical radiation in said core region at at least two wavelengths within said range,
    said core region being co-doped with aluminum oxide, phosphorous oxide, germanium oxide and fluorine, the concentrations and distribution of said co-dopants being radially varied so that the refractive index of said core region is radially graded and so that the optimum profile shape parameter of said fiber is essentially independent of wavelength within said range.

2. The fiber of claim 1, wherein said core region is co-doped with no more than approximately 6 mole % $Al_2O_3$, 9 mole % $P_2O_5$, 6 mole % $GeO_2$, 6 mole % fluorine, and including 90-100 mole % $SiO_2$.

3. The fiber of claim 2, wherein said core region is co-doped with no more than approximately 2 mole % $P_2O_5$.

4. The fiber of claim 1, wherein said core region includes an inner core region and an outer core region, said inner core region including essentially no fluorine and said outer core region including essentially no phosphorous oxide.

5. The fiber of claim 1, wherein said core region includes an inner core region and an outer core region and wherein the dispersion of said outer core region is essentially the same as that of said cladding region.

6. The fiber of claim 5, wherein said cladding region comprises undoped silica.

7. The fiber of claim 6, wherein said outer core region comprises no more than approximately 2 mole % fluorine.

8. The fiber of claim 6, wherein said outer core region comprises no more than approximately 2 mole % germanium oxide.

9. The fiber of claim 8, wherein said outer core region has a higher concentration of germanium oxide than said inner core region.

10. The fiber of claim 1, wherein the refractive index of said core region is graded from a maximum at the center of said core region to a minimum near the outer edge of said core region, said grading following an essentially parabolic profile as defined by equation (1).

11. The fiber of claim 1, wherein said refractive index profile shape parameter varies by no more than approximately 0.01 over said range.

12. A multimode optical fiber comprising:

a multilayered silicate glass core region having a refractive index profile shape parameter for broadband operation at wavelengths in the approximate range of 0.78 to 1.55 µm, said core region including an inner core region and an outer core region, and an undoped silica cladding region adjacent said outer core region, said core and cladding regions being configured to have an NA of 0.200±0.015 and to support the simultaneous propagation of optical radiation in said core region at at least two wavelengths within said range, said core region layers being co-doped with no more than approximately 6 mole % $Al_2O_3$, 9 mole % $P_2O_5$, 6 mole % $GeO_2$, 6 mole % fluorine, and including 90-100 mole % $SiO_2$, the concentrations of said co-dopants being radially varied so that the refractive index of said core region is radially graded and so that said optimum profile shape parameter of said fiber is essentially independent of wavelength within said range, said outer core region including essentially no $P_2O_5$ and said inner core region including essentially no F;

said outer core region having a higher concentration of $GeO_2$ than said inner core region, and the dispersion of said outer core region is essentially the same as that of said undoped silica cladding region.

13. The fiber of claim 12, wherein said refractive index profile shape parameter varies by no more than approximately 0.01 over said range.

14. The fiber of claim 13, wherein the radius r of said inner core region extends from r=0 to r=i, the radius of said outer core region extends from r=i to r=a, and (1) the $Al_2O_3$ concentration is essentially constant at approximately 6 mole % from r=0 to r=0.4a and then decreases essentially linearly to 0 mole % at r~a; (2) the $P_2O_5$ concentration decreases essentially linearly from a maximum of approximately 3 mole % at r=0 to 0 mole % at r=i~0.75a; (3) the $GeO_2$ concentration increases essentially linearly from approximately 1 mole % at r=0 to a maximum of approximately 2 mole % at r=a, and (4) the F concentration increases essentially linearly from 0 mole % at r=i~0.75a to a maximum of approximately 2 mole % at r=a.

* * * * *